(12) United States Patent
Wu et al.

(10) Patent No.: US 8,334,952 B2
(45) Date of Patent: Dec. 18, 2012

(54) 2D AND 3D SWITCHABLE DISPLAY DEVICE

(75) Inventors: Yu-June Wu, Hsin-Chu (TW); Po-Wei Wu, Hsin-Chu (TW); Ming-Fang Chien, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 202 days.

(21) Appl. No.: 12/915,043

(22) Filed: Oct. 29, 2010

(65) Prior Publication Data

US 2011/0273635 A1 Nov. 10, 2011

(30) Foreign Application Priority Data

May 6, 2010 (TW) .............................. 99114502 A

(51) Int. Cl.
*G02F 1/1335* (2006.01)
(52) U.S. Cl. ...................................... 349/112
(58) Field of Classification Search .................. 349/112, 349/87, 96
See application file for complete search history.

(56) References Cited

U.S. PATENT DOCUMENTS

| | | | | |
|---|---|---|---|---|
| 6,965,197 B2 * | 11/2005 | Tyan et al. | ..................... | 313/506 |
| 7,518,664 B2 | 4/2009 | Mather | | |
| 2003/0063186 A1 | 4/2003 | Tomono | | |
| 2006/0001364 A1 * | 1/2006 | Chao et al. | ..................... | 313/506 |
| 2007/0058127 A1 | 3/2007 | Mather | | |
| 2007/0058258 A1 | 3/2007 | Mather | | |
| 2008/0117231 A1 * | 5/2008 | Kimpe | ......................... | 345/629 |

FOREIGN PATENT DOCUMENTS

JP 2003177356 6/2003

* cited by examiner

*Primary Examiner* — Phu Vu
(74) *Attorney, Agent, or Firm* — Winston Hsu; Scott Margo

(57) ABSTRACT

A 2D and 3D switchable display device includes an organic light emitting diode display unit, a polarization activated microlens, a polarization switching unit and a polarizer. The organic light emitting diode display unit includes a top substrate, a bottom substrate and an organic light emitting diode display array disposed between the top substrate and the bottom substrate. The polarization activated microlens is disposed between the top substrate and the organic light emitting diode display array, and the polarization activated microlens directly contacts both the top substrate and the organic light emitting diode display array. The polarization switching unit is disposed on the top substrate, and the polarizer is disposed on the polarization switching unit.

11 Claims, 9 Drawing Sheets

2D AND 3D SWITCHABLE DISPLAY DEVICE

BACKGROUND OF THE INVENTION

1. Field of the Invention

The present invention relates to a two-dimensional (2D) and three-dimensional (3D) switchable display device, and more particularly, to a 2D and 3D switchable display device that includes an embedded polarization activated microlens in order to omit at least one glass substrate (such as transparent substrate) which is used to cover the polarization activated microlens.

2. Description of the Prior Art

The principle of stereoscopic display technique is to make the left eye and right eye of the viewer receive different images separately. These different images separately received by the left eye and right eye will be analyzed by human brain so that the viewer can perceive the depth of image. Consequently, stereoscopic vision is generated.

At present, the stereoscopic display devices can be mainly classified into two types: time-sequential type and spatial-multiplexed type. The time-sequential type stereoscopic display device provides left-eye image for left eye and right-eye image for right eye in turn in a scanning manner. When viewing the display device, the viewer must wear a pair of shutter glasses. The pair of shutter glasses allows the left eye of the viewer to see the left-eye image but blocks the right eye of the viewer to see the left-eye image when the display device display the left-eye image, and allows the right eye of the viewer to see the right-eye image but blocks the left eye of the viewer to see the right-eye image when the display device display the right-eye image. Accordingly, stereoscopic display effect can be obtained. The spatial-multiplexed type stereoscopic display device includes a parallax barrier type stereoscopic display device. The parallax barrier type stereoscopic display device uses a parallax barrier disposed in front of the display device. When observing the display device, the left eye and the right eye of the viewer, due to their different viewing angle with respect to the parallax barrier, will only see the left-eye image and the right-eye image separately.

The conventional stereoscopic display devices, however, face some problems or disadvantages in their applications. For example, the viewer of the time-sequential type stereoscopic display device must wear a pair of shutter glasses, which causes inconvenience in use. The spatial-multiplexed type stereoscopic display device has limitation in the distance between the viewer and the display device when observing. Specifically, the viewer can only obtain the stereoscopic images in some particular distance range. In addition, when the spatial-multiplexed type stereoscopic display device is applied in high resolution mobile phone or other high resolution portable electronic products, in which the optimal 3D display viewing distance is shorter, the glass substrate between the parallax barrier and the display device has to be reduced so that the viewing distance can be reduced to meet the optimal 3D display viewing distance. However, the thickness reduction of the glass substrate is restricted to the limitation of glass process, and the structural strength of the glass substrate will be affected when reducing the thickness of the glass substrate. Therefore, to shorten the viewing distance of the stereoscopic display device applied in high resolution portable electronic product is an important issue to be solved.

SUMMARY OF THE INVENTION

It is therefore one of the objectives of the present invention to provide a 2D and 3D switchable display device to reduce the optimal 3D display viewing distance.

According to the present invention, a 2D and 3D switchable display device is provided. The 2D and 3D switchable display device includes an organic light emitting diode (OLED) display unit, a polarization activated microlens (PAM), a polarization switching unit and a polarizer. The OLED display unit includes a top substrate, a bottom substrate and an OLED display array disposed between the top substrate and the bottom substrate. The polarization activated microlens (PAM) is disposed between the top substrate and the OLED display array, wherein the PAM is in contact with the top substrate and the OLED display array. The polarization switching unit is disposed on the top substrate of the OLED display unit. The polarizer is disposed on the polarization switching unit.

According to the present invention, another 2D and 3D switchable display device is provided. The 2D and 3D switchable display device includes an image display unit, a polarization switching unit, and a PAM. The polarization switching unit includes a bottom transparent substrate, a first transparent conductive layer disposed on the bottom transparent substrate, a second transparent conductive layer disposed on the first transparent conductive layer, and a top transparent substrate disposed on the second transparent conductive layer. The PAM is disposed between the second transparent conductive layer and the top transparent substrate; wherein the PAM is in contact with the second transparent conductive layer and the top transparent substrate.

The PAM is embedded into (or namely built-in) the OLED display unit, and thus at least one glass substrate (such as transparent substrate) which is used to cover the PAM can be omitted. In addition, when the image display unit is a liquid crystal display unit e.g. a twisted nematic (TN) liquid crystal display unit, a vertical alignment (VA) liquid crystal display unit, an in-plane switching (IPS) liquid crystal display unit or any other types of image display unit, but not limited thereto, the PAM is embedded into (or namely built-in) the polarization switching unit, and the glass substrate (such as transparent substrate) can also be omitted. In comparison with the conventional spatial-multiplexed type stereoscopic display device, which reduces its optimal 3D display viewing distance by using thinned glass, the present invention provides a more efficient way to reduce the optimal 3D display viewing distance.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in details. The preferred embodiments of the present invention are illustrated in the accompanying drawings with numbered elements.

Figure 1:
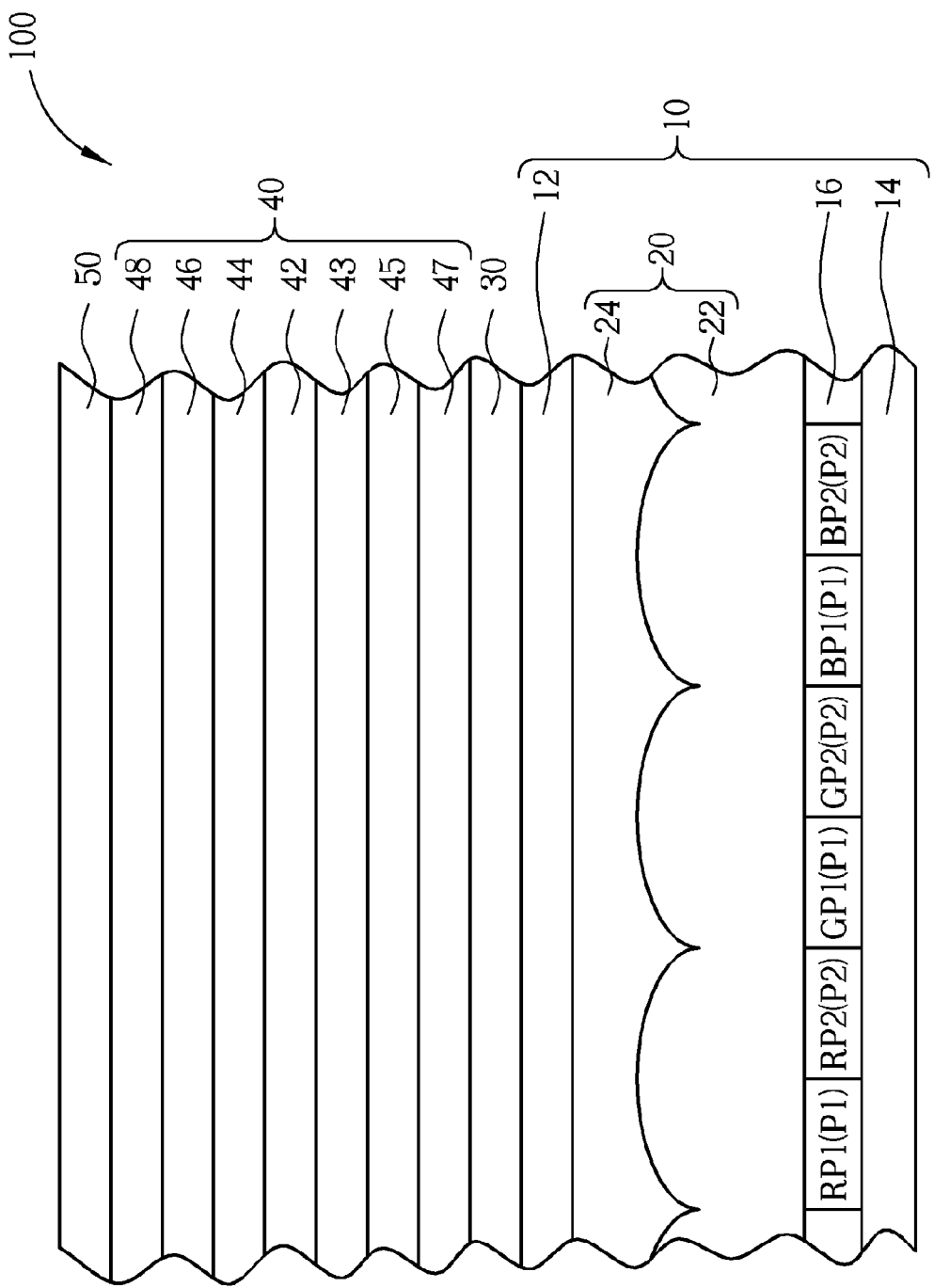
FIG. 1 is a schematic diagram illustrating a 2D and 3D switchable display device according to a first embodiment of the present invention.

Please refer to FIG. 1. FIG. 1 is a schematic diagram illustrating a 2D and 3D switchable display device according to a first embodiment of the present invention. As shown in FIG. 1, the 2D and 3D switchable display device 100 includes an organic light emitting diode (OLED) display unit 10, a polarization activated microlens (PAM) 20, a polarization switching unit 40, and a polarizer 50 disposed on the polarization switching unit 40. In this embodiment, the OLED display unit 10 includes a top substrate 12, a bottom substrate 14, and an OLED display array 16 disposed between the top substrate 12 and the bottom substrate 14. The PAM 20 is disposed between the top substrate 12 and the OLED display array 16 of the OLED display unit 10, and the PAM 20 is in contact with the top substrate 12 and the OLED display array 16. The PAM 20 includes a liquid crystal polymer (LCP) layer 22 and a structural layer 24. The LCP layer 22 and the structural layer 24 are in contact with each other, the LCP layer 22 is in contact with the OLED display array 16, and the structural layer 24 is in contact with the top substrate 12. Specifically speaking, the PAM 20 is embedded in (or namely built-in) the OLED display unit 10, and therefore no glass substrate (such as transparent substrate) that is used to cover the PAM 20 is required. The embedded PAM 20 makes it possible to reduce the thickness of the 2D and 3D switchable display device 100. The LCP layer 22 has birefringence, which includes an ordinary refractive index and an extraordinary refractive index. The structural layer 24 has a refractive index, and the refractive index of the structural layer 24 is substantially identical to one of the ordinary refractive index and the extraordinary refractive index, i.e. the refractive index of the structural layer 24 is substantially identical to the ordinary refractive index or identical to the extraordinary refractive index. In this embodiment, the refractive index of the structural layer 24 is substantially identical to the ordinary refractive index of the LCP layer 22, but not limited thereto. The polarization switching unit 40 is disposed on the top substrate 12 of the OLED display unit 10, and the polarization switching unit 40 includes a liquid crystal layer 42, a pair of alignment films 43, 44, a pair of transparent conductive layers 45, 46, and a pair of transparent substrates 47, 48. The liquid crystal layer 42 is disposed between the pair of alignment films 43, 44, the pair of alignment films 43, 44 is disposed between the pair of transparent conductive layers 45, 46, and the pair of transparent conductive layers 45, 46 is disposed between the pair of transparent substrates 47, 48. In addition, the polarization switching unit 40 may be twisted nematic (TN) liquid crystal display unit, but not limited thereto. The 2D and 3D switchable display device 100 further includes an adhesive layer 30 disposed between the top substrate 12 of the OLED display unit 10 and the polarization switching unit 40 for bonding the top substrate 12 of the OLED display unit 10 and the transparent substrate 47 of the polarization switching unit 40.

In this embodiment, the OLED display array 16 of the OLED display unit 10 at least includes a plurality of first pixel units P1 and second pixel units P2. The first pixel units P1 at least include first red sub-pixels RP1, first green sub-pixels GP1 and first blue sub-pixels BP1. The second pixel units P2 at least include second red sub-pixels RP2, second green sub-pixels GP2 and second blue sub-pixels BP2. In this embodiment, the OLED display unit 10 emits natural light, and thus some of the images provided by the first pixel units P1 and the second pixel units P2 of the OLED display array 16 have a first polarized direction, while the rest of the images provided by the first pixel units P1 and the second pixel units P2 of the OLED display array 16 have a second polarized direction substantially perpendicular to the first polarized direction.

When the 2D and 3D switchable display device 100 displays images, the OLED display array 16 of the OLED display unit 10 emits images toward the PAM 20. The images will penetrate through the LCP layer 22, the structural layer 24, the top substrate 12, the adhesive layer 30, the polarization switching unit 40 and the polarizer 50 successively, but not limited thereto. When entering the LCP layer 22, the images having the first polarized direction will be refracted due to the difference between the ordinary refractive index of the LCP layer 22 and the refractive index of the structural layer 24 if exists, and the images having the second polarized direction will be refracted due to the difference between the extraordinary refractive index of the LCP layer 22 and the refractive index of the structural layer 24 if exists. In this embodiment, since the refractive index of the structural layer 24 is substantially identical to the ordinary refractive index of the LCP layer 22, no refraction occurs when the images having the first polarized direction enter the structural layer 24 from the LCP layer 22. On the other hand, refraction occurs when the images having the second polarized direction enter the structural layer 24 from the LCP layer 22 due to the difference of refractive index between the LCP layer 22 and the structural layer 24. In addition, the LCP layer 22 (as shown in FIG. 1) has a convex shape. Thus, when the images having the second polarized direction enter the structural layer 24 from the LCP layer 22, the light beams having the second polarized direction entering the structural layer 24 at different positions will be refracted toward two different directions accordingly.

It can be seen that no refraction occurs when the images for 2D display having the first polarized direction penetrate through the interface of the LCP layer 22 and the structural layer 24, while refraction occurs when the images for 3D display having the second polarized direction penetrate through the interface of the LCP layer 22 and the structural layer 24 due to their refractive index difference. In the following passages, the operation of switching between 2D and 3D display of the 2D and 3D switchable display device 100 implemented by the polarization switching unit 40 and the polarizer 50 will be elaborated.

Figure 2:
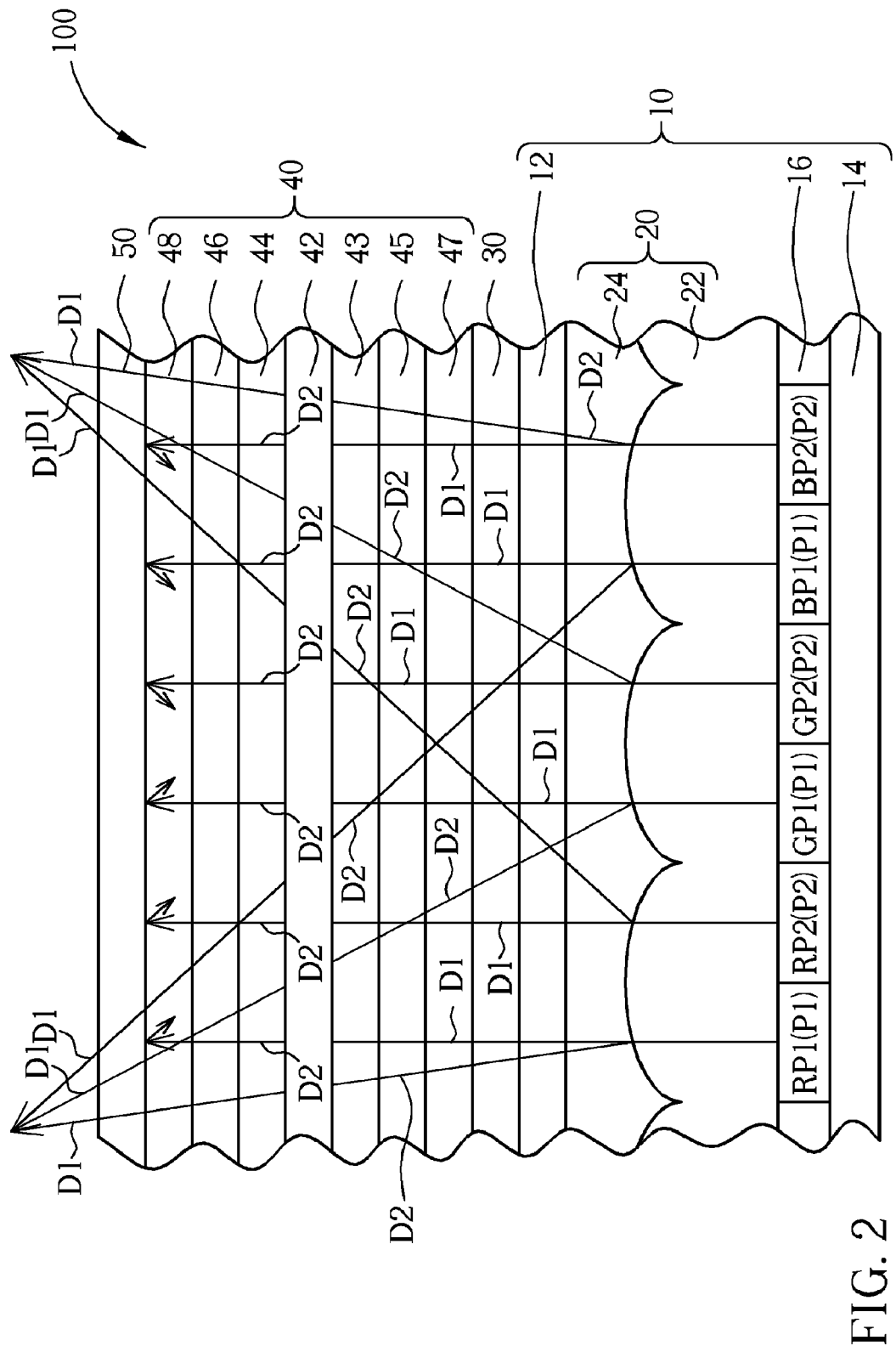
FIG. 2 is a schematic diagram illustrating the 2D and 3D switchable display device in a 3D display mode according to the first embodiment of the present invention.

Please refer to FIG. 2. FIG. 2 is a schematic diagram illustrating the 2D and 3D switchable display device in a 3D display mode according to the first embodiment of the present invention. As shown in FIG. 2, in a 3D display mode, the images emitted by the first pixel units P1 and the second pixel units P2 are provided for the left eye of the right eye of the viewer respectively, such that the left eye of the right eye of the viewer can perceive different images, thereby experiencing 3D display effect. The polarizer 50 has a light transmission axis parallel to a first polarized direction D1. In the 3D display mode, the polarization switching unit 40 is able to convert the images having the first polarized direction D1 into the images having a second polarized direction D2, and to convert the images having the second polarized direction D2 into the images having the first polarized direction D1. Accordingly, the images having the first polarized direction D1 converted from the second polarized direction D2 can penetrate through the polarizer 50, and refracted by the LCP layer 22 to reach the left eye and the right eye of the viewer. On the other hand, the images having the second polarized direction D2 converted from the first polarized direction D1 are blocked by the polarizer 50 after passing the polarization switching unit 40 because the second polarized direction D2 is perpendicular to the light transmission axis of the polarizer 50.

Figure 3:
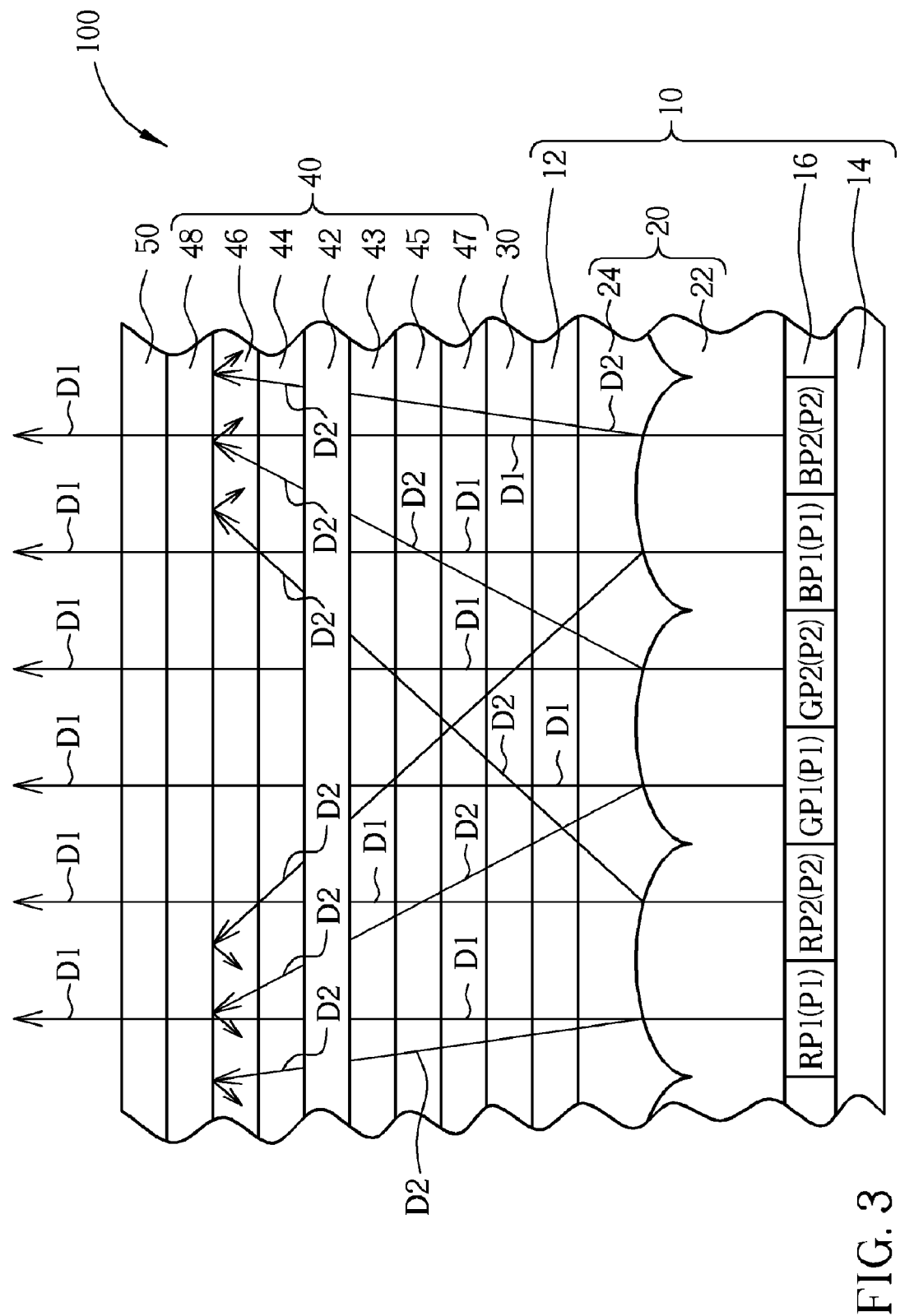
FIG. 3 is a schematic diagram illustrating the 2D and 3D switchable display device in a 2D display mode according to the first embodiment of the present invention.

Please refer to FIG. 3. FIG. 3 is a schematic diagram illustrating the 2D and 3D switchable display device in a 2D display mode according to the first embodiment of the present invention. As shown in FIG. 3, in a 2D display mode, the images emitted by the first pixel units P1 and the second pixel units P2 are provided for both the left eye of the right eye of the viewer simultaneously. In the 2D display mode, the twisted direction of the liquid crystal layer 42 of the polarization switching unit 40 is altered, such that the first polarized direction D1 of the images is not changed, and the image having the first polarized direction D1 can directly penetrate through the polarization switching unit 40 and the polarizer 50. On the other hand, the image having the second polarized direction D2 after passing the polarization switching unit 40 will be blocked by the polarizer 50. Accordingly, 2D display effect is accomplished.

In this embodiment, according to the design of the polarization switching unit 40, different operation modes using different voltages can be used to alter or not to alter the polarized direction. For instance, in the 3D display mode, a voltage potential can be applied between the transparent conductive layers 45, 46 of the polarization switching unit 40 to convert the images having the first polarized direction D1 into the images having the second polarized direction D2, and to convert the images having the second polarized direction D2 into the images having the first polarized direction D1. Alternatively, the images having the first polarized direction D1 can be converted into the images having the second polarized direction D2, and the images having the second polarized direction D2 can be converted into the images having the first polarized direction D1 by applying no voltage potential between the transparent conductive layers 45, 46 of the polarization switching unit 40. In addition, in the 2D display mode, the images having the first polarized direction D1 and the images having the second polarized direction D2 are kept unaltered by either applying a voltage potential between the transparent conductive layers 45, 46 of the polarization switching unit 40 or not applying voltage potential between the transparent conductive layers 45, 46 of the polarization switching unit 40. It is to be noted that the light transmission axis of the polarizer 50 is not limited to be substantially parallel to the first polarized direction D1, and can be for example parallel to the second polarized direction D2. In case the light transmission axis of the polarizer 50 is substantially parallel to the second polarized direction D2, the operation of the polarization switching unit 40 should be changed correspondingly. For example, in the 2D display mode, the polarization switching unit 40 converts the images having the first polarized direction D1 into the images having the second polarized direction D2, such that the images having the second polarized direction D2 can penetrate through the polarizer 50; in the 3D display mode, the second polarized direction D2 of the images is not altered by the polarization switching unit 40, and thus the images having the second polarized direction D2 can directly pass through the polarizer 50.

Figure 4:
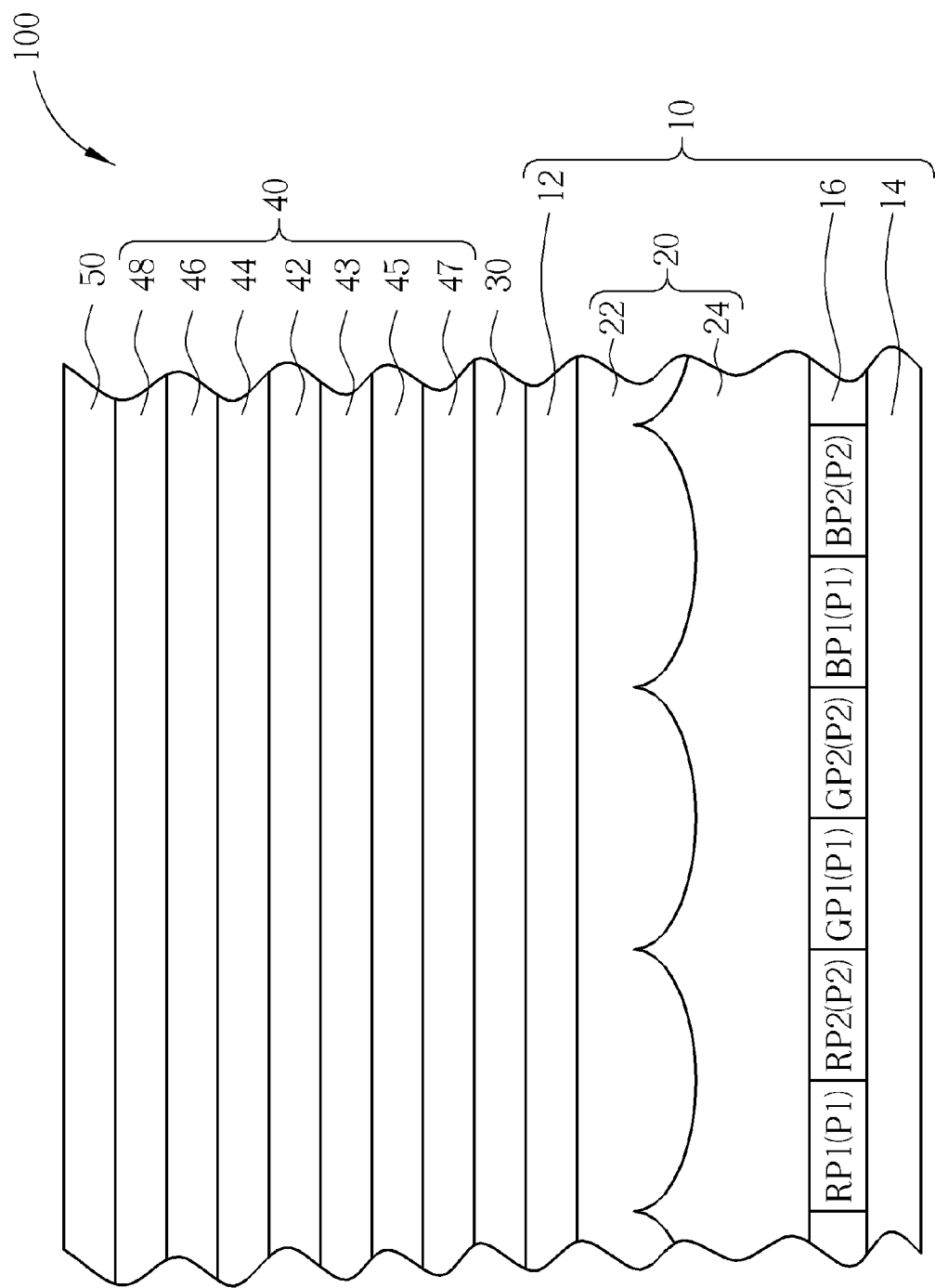
FIG. 4 is a schematic diagram illustrating a 2D and 3D switchable display device according to a second embodiment of the present invention.

Please refer to FIG. 4. FIG. 4 is a schematic diagram illustrating a 2D and 3D switchable display device according to a second embodiment of the present invention. In order to compare the differences between different embodiments, same components are denoted by same numerals, and repeated parts are not redundantly described. As shown in FIG. 4, the relative position of the LCP layer 22 and the structural layer 24 of the PAM 20 in this embodiment is contrary to that in the first embodiment. To be exact, the LCP layer 22 is disposed between the structural layer 24 and the top substrate 12 of the OLED display unit 10, the LCP layer 22 is in contact with the structural layer 24 and the top substrate 12, and the structural layer 24 is in contact with the OLED display array 16 in this embodiment. By virtue of the above arrangement, at least one glass substrate (such as transparent substrate) that is used to cover and protect the PAM 20 is no longer required. In this embodiment, the PAM 20 is embedded into (or namely built-in) the OLED display unit 10, and thus the thickness of the 2D and 3D switchable display device 100 can be reduced. In this embodiment, though the positions of the LCP layer 22 and the structural layer 24 are exchanged, the 2D and 3D switching operation is similar to that in the first embodiment.

Figure 5:
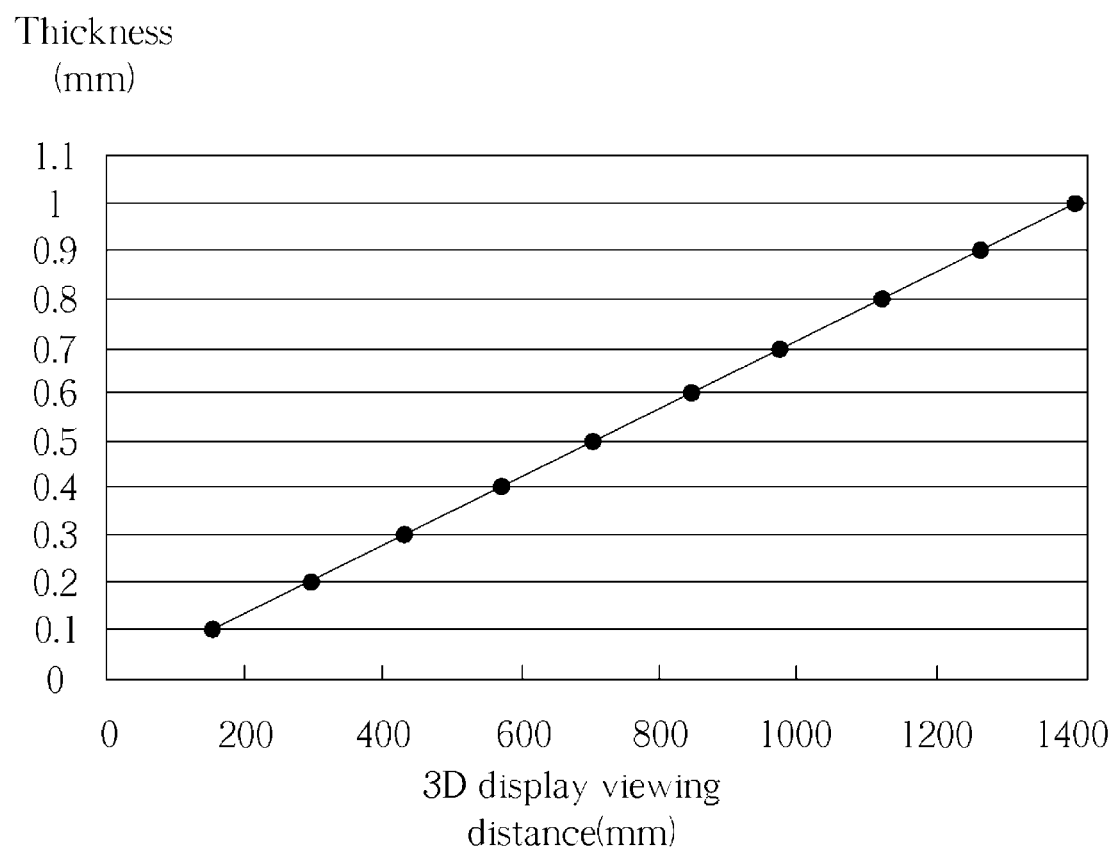
FIG. 5 is a schematic diagram illustrating a 3D display viewing distance vs. thickness relation of a 3D display panel.

Please refer to FIG. 5. FIG. 5 is a schematic diagram illustrating a 3D display viewing distance vs. thickness relation of a 3D display panel. The 3D display viewing distance is the distance between the viewer and the 3D display panel, and the thickness is the distance between the OLED display array and the PAM. The 3D display panel of FIG. 5 is a 3D display panel having 2.83 inch screen, and having a resolution of 283 pixels per inch. The X axis represents the 3D display viewing distance, and the unit is millimeter (mm). The Y axis represents the thickness, and the unit is millimeter (mm). As shown in FIG. 5, when the 3D display viewing distance decreases, the corresponding thickness will decrease in proportion to the decrease of the 3D display viewing distance. Normally, the optimal 3D display viewing distance is about 300 millimeters, and the corresponding thickness is about 0.2 millimeters. To obtain the optimal 3D display viewing distance, the PAM is embedded into (or namely built-in) the OLED display unit and is in contact with the OLED display array of the OLED display unit according to the first and second embodiments, which is an effective way to reduce the distance between the OLED display array and the PAM.

Figure 6:
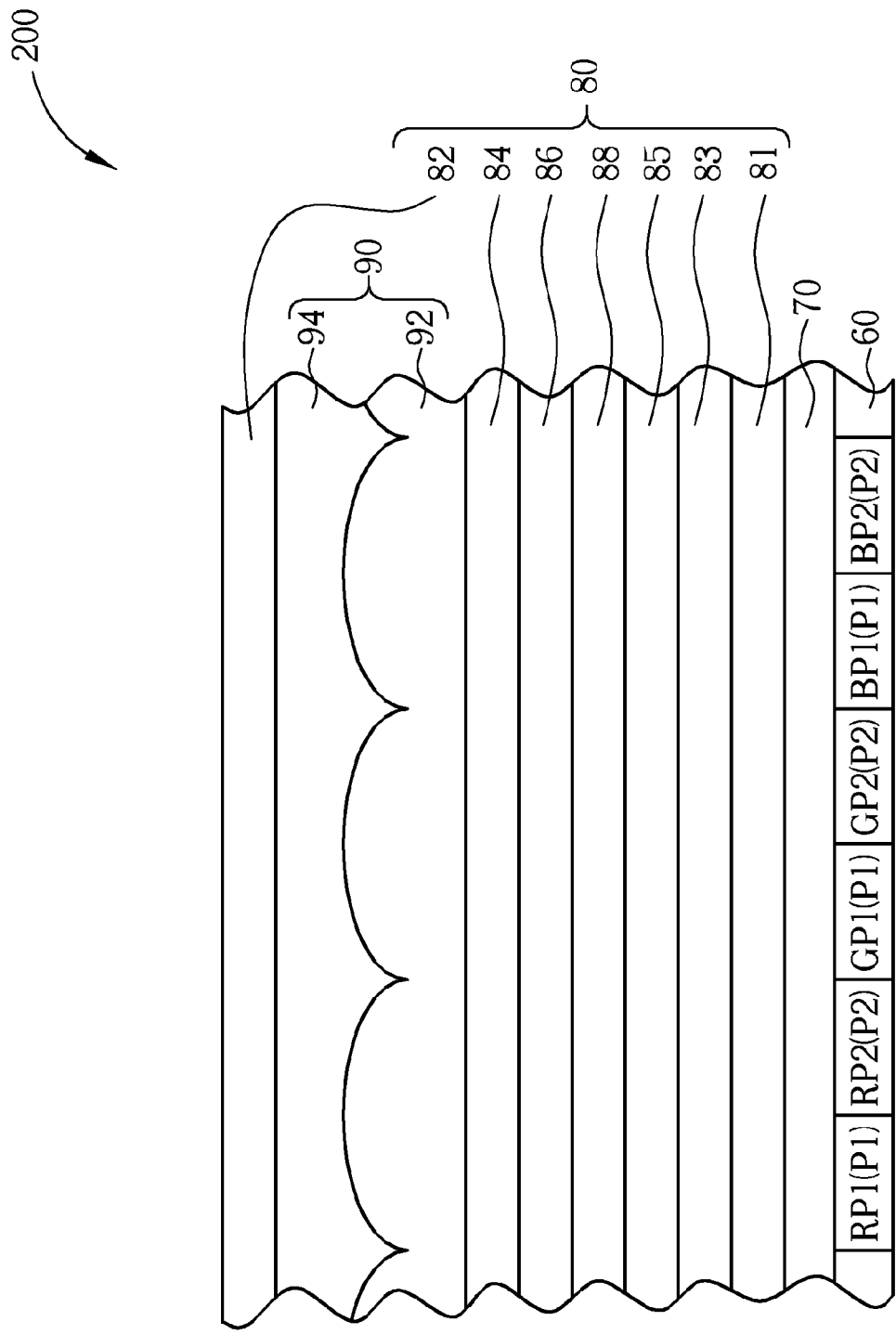
FIG. 6 is a schematic diagram illustrating a 2D and 3D switchable display device according to a third embodiment of the present invention.

Please refer to FIG. 6. FIG. 6 is a schematic diagram illustrating a 2D and 3D switchable display device according to a third embodiment of the present invention. As shown in FIG. 6, the 2D and 3D switchable display device 200 includes an image display unit 60, a polarization switching unit 80, and a PAM 90. In this embodiment, the polarization switching unit 80 includes a bottom transparent substrate 81, a first transparent conductive layer 83 disposed on the bottom transparent substrate 81, a second transparent conductive layer 84 disposed on the first transparent conductive layer 83, a top transparent substrate 82 disposed on the second transparent conductive layer 84, a pair of alignment films 85, 86 disposed between the first transparent conductive layer 83 and the second transparent conductive layer 84, and a liquid crystal layer 88 disposed between the pair of alignment films 85, 86. In addition, the PAM 90 is disposed between the second transparent conductive layer 84 and the top transparent substrate 82 of the polarization switching unit 80, and is in contact with the second transparent conductive layer 84 and the top transparent substrate 82. In this embodiment, the PAM 90 further includes an LCP layer 92 and a structural layer 94 in contact with each other. The LCP layer 92 has birefringence, which includes an ordinary refractive index and an extraordinary refractive index. The structural layer 94 has a refractive index, and the refractive index of the structural layer 94 is substantially identical to one of the ordinary refractive index and the extraordinary refractive index, i.e. the refractive index of the structural layer 94 is substantially identical to the ordinary refractive index or identical to the extraordinary refractive index. In this embodiment, the refractive index of the structural layer 94 is substantially identical to the ordinary refractive index of the LCP layer 92, but not limited thereto. The LCP layer 92 is in contact with the second transparent conductive layer 84, and the structural layer 94 is in contact with the top transparent substrate 82. Since the PAM 90 is embedded in (or namely built-in) the polarization switching unit 80, at least one glass substrate (such as transparent substrate) that is used to cover and protect the PAM 90 is no longer required. Thus, the thickness of the 2D and 3D switchable display device 200 is reduced. The 2D and 3D switchable display device 200 further includes an adhesive layer 70 disposed between the image display unit 60 and the bottom transparent substrate 81 of the polarization switching unit 80 for bonding the image display unit 60 and the bottom transparent substrate 81 of the polarization switching unit 80.

In this embodiment, the image display unit 60 of the 2D and 3D switchable display device 200 includes a liquid crystal display unit e.g. a twisted nematic (TN) liquid crystal display unit, a vertical alignment (VA) liquid crystal display unit, an in-plane switching (IPS) liquid crystal display unit or any other types of image display unit, but not limited thereto. The image display unit 60 at least includes a plurality of first pixel units P1 and second pixel units P2. The first pixel units P1 at least include first red sub-pixels RP1, first green sub-pixels GP1 and first blue sub-pixels BP1. The second pixel units P2 at least include second red sub-pixels RP2, second green sub-pixels GP2 and second blue sub-pixels BP2. When the 2D and 3D switchable display device 200 displays images, the first pixel units P1 and the second pixel units P2 emit the images toward the polarization switching unit 80, and the images will pass through the adhesive layer 70, the bottom transparent substrate 81, the first transparent conductive layer 83, the alignment film 85, the liquid crystal layer 88, the alignment film 86, the second transparent conductive layer 84, the LCP layer 92, the structural layer 94 and the top transparent substrate 82, but not limited thereto.

Figure 7:
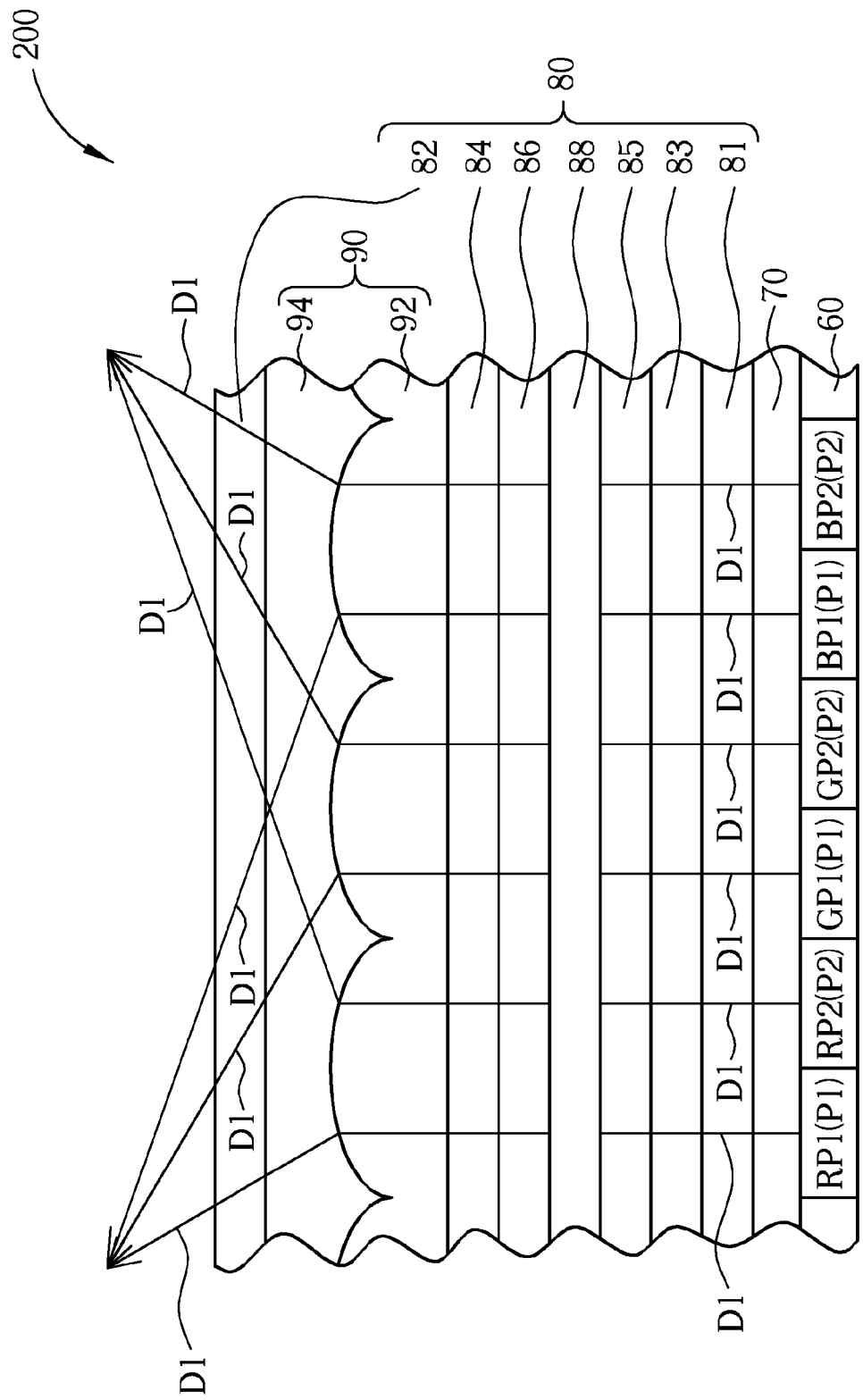
FIG. 7 is a schematic diagram illustrating the 2D and 3D switchable display device in a 3D display mode according to the third embodiment of the present invention.

Please refer to FIG. 7. FIG. 7 is a schematic diagram illustrating the 2D and 3D switchable display device in a 3D display mode according to the third embodiment of the present invention. As shown in FIG. 7, the images emitted by the first pixel units P1 and the second pixel units P2 are for the left eye and the right eye of the viewer, respectively. The images emitted by the first pixel units P1 and the second pixel units P2 of the image display unit 60 have a first polarized direction D1. In the 3D display mode, the images having the first polarized direction D1 will penetrate through the liquid crystal layer 88 of the polarization switching unit 80, and then enter the LCP layer 92 and the structural layer 94 of the PAM 90 successively. In this embodiment, refraction will occur when the images having the first polarized direction D1 passes through the interface between the LCP layer 92 and the structural layer 94. Specifically, the refractive index of the structural layer 94 is identical to the ordinary refractive index of the LCP layer 92, but different from the extraordinary refractive index of the LCP layer 92, and consequently, the images having the first polarized direction D1 will be refracted toward two different directions (e.g. toward to the left eye and the right eye of the viewer) due to the change of refractive index and the convex structure of the LCP layer 92. As a result, 3D display effect can be obtained.

Figure 8:
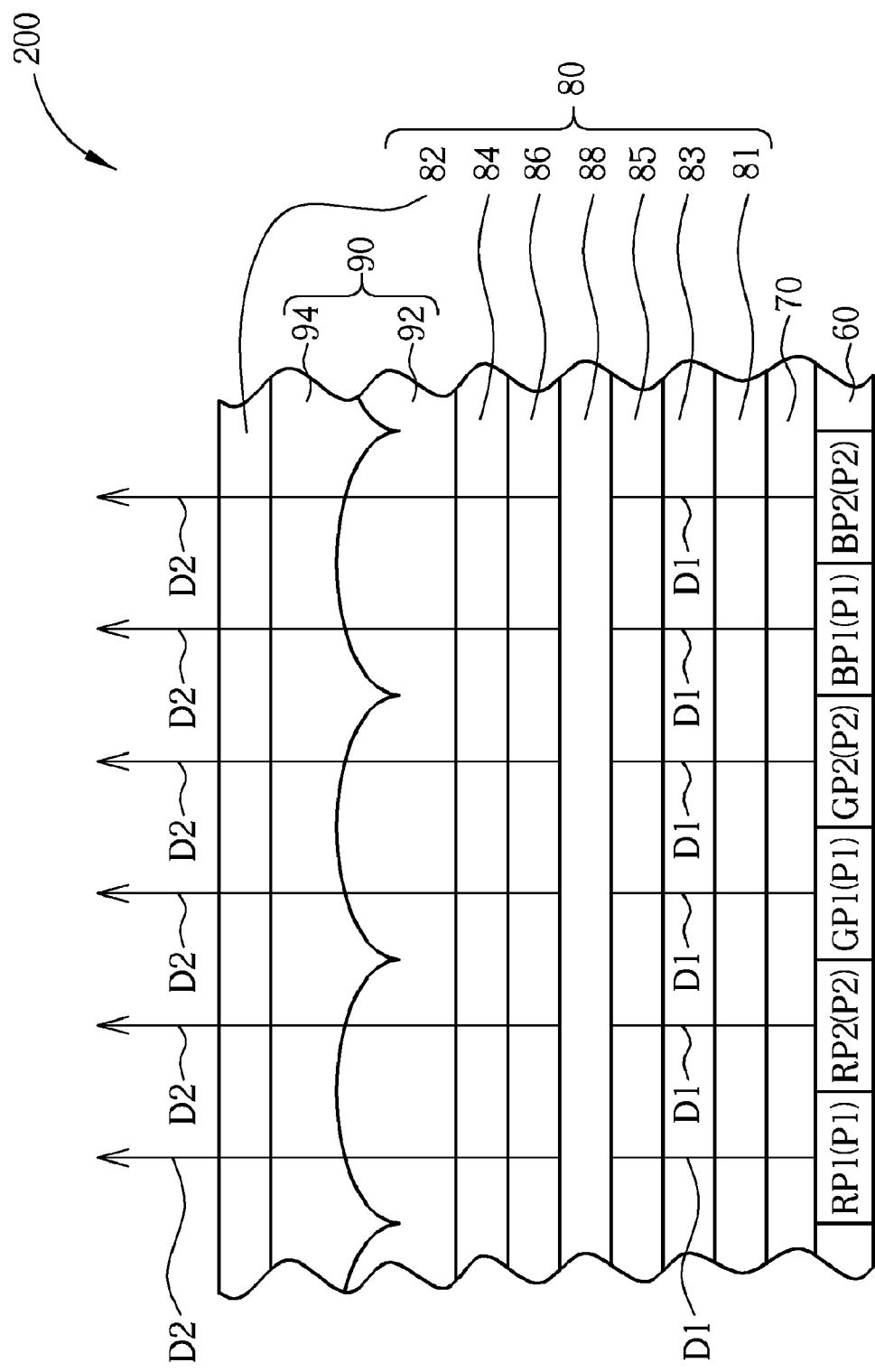
FIG. 8 is a schematic diagram illustrating the 2D and 3D switchable display device in a 2D display mode according to the third embodiment of the present invention.

Please refer to FIG. 8. FIG. 8 is a schematic diagram illustrating the 2D and 3D switchable display device in a 2D display mode according to the third embodiment of the present invention. As shown in FIG. 8, in 2D display mode, the images emitted by the first pixel units P1 and the second pixel units P2 are provided for both the left eye of the right eye of the viewer simultaneously. In the 2D display mode, the polarization switching unit 80 is able to convert the images having the first polarized direction D1 into the images having the second polarized direction D2 perpendicular to the first polarized direction D1 after passing through the liquid crystal layer 88. Since the refractive index of the structural layer 94 is identical to the ordinary refractive index of the LCP layer 92, no refraction will occur when the images having the second polarized direction D2 penetrate through the interface between the LCP layer 92 and the structural layer 94. Thus, 2D display effect can be obtained.

In this embodiment, according to the design of the polarization switching unit 80, different operation modes using different voltages can be used to alter or not to alter the polarized direction. For instance, in the 3D display mode, a voltage potential can be applied between the first transparent conductive layer 83 and the second transparent conductive layer 84 of the polarization switching unit 80 to convert the images having the first polarized direction D1 into the images having the second polarized direction D2. Alternatively, the images having the first polarized direction D1 can be converted into the images having the second polarized direction D2 by applying no voltage potential between the first transparent conductive layer 83 and the second transparent conductive layer 84 of the polarization switching unit 80. In addition, in the 2D display mode, the images having the first polarized direction D1 are kept unaltered by either applying a voltage potential between the first transparent conductive layer 83 and the second transparent conductive layer 84 of the polarization switching unit 80 or by not applying voltage potential between the first transparent conductive layer 83 and the second transparent conductive layer 84 of the polarization switching unit 80.

It is to be noted that the images emitted by the first pixel units P1 and the second pixel units P2 of the image display unit 60 are not limited to have the first polarized direction D1. When the images emitted by the first pixel units P1 and the second pixel units P2 of the image display unit 60 have the second polarized direction D2, the operation of the polarization switching unit 80 should be modified correspondingly. For example, in the 3D display mode, the polarization switching unit 80 converts the images having the second polarized direction D2 into the images having the first polarized direction D1, such that the images having the first polarized direction D1 can be refracted toward two different directions when passing through the interface between the LCP layer 92 and the structural layer 94. In the 2D display mode, the polarization switching unit 80 does not change the polarized direction of the images having the second polarized direction D2, and no refraction will occur when the images having the second polarized direction D2 pass through the interface between the LCP layer 92 and the structural layer 94.

Figure 9:
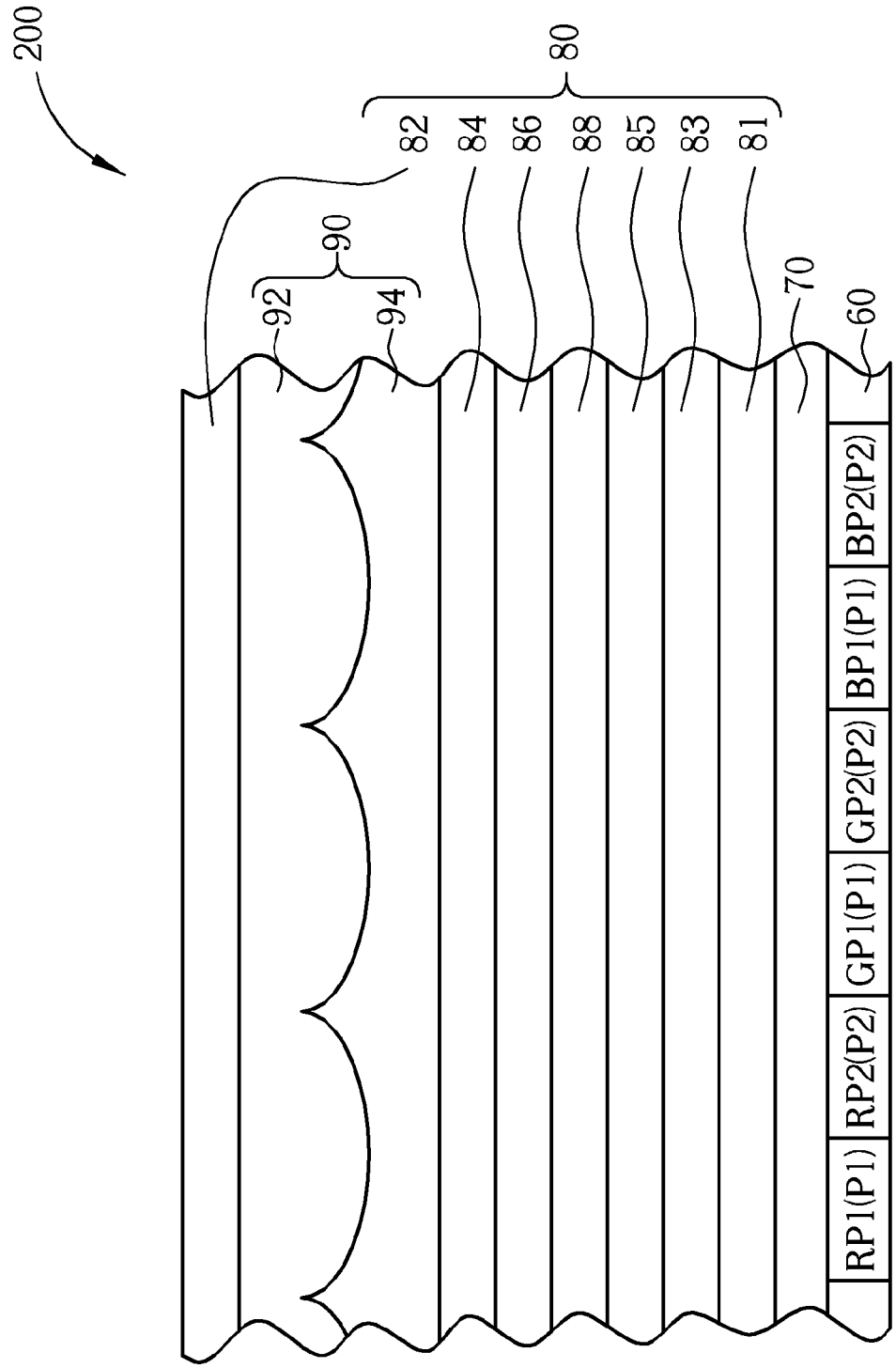
FIG. 9 is a schematic diagram illustrating a 2D and 3D switchable display device according to a fourth embodiment of the present invention.

Please refer to FIG. 9. FIG. 9 is a schematic diagram illustrating a 2D and 3D switchable display device according to a fourth embodiment of the present invention. In order to compare the differences between different embodiments, same components are denoted by same numerals, and repeated parts are not redundantly described. As shown in FIG. 9, the relative position of the LCP layer 92 and the structural layer 94 of the PAM 90 in this embodiment is contrary to that in the third embodiment. To be exact, the LCP layer 92 is disposed between the structural layer 94 and the top transparent substrate 82 of the polarization switching unit 80, the LCP layer 92 is in contact with the structural layer 94 and the top transparent substrate 82, and the structural layer 94 is in contact with the second transparent conductive layer 84. In this embodiment, though the positions of the LCP layer 92 and the structural layer 94 are exchanged, the 2D and 3D switching operation is similar to that in the third embodiment.

In summary, the PAM is embedded into (or namely built-in) the OLED display unit, and thus at least one glass substrate (such as transparent substrate) which is used to cover the PAM can be omitted. In addition, when the display unit is an image display unit, the PAM is embedded into (or namely built-in) the polarization switching unit, and the glass substrate (such as transparent substrate) can also be omitted. In comparison with the conventional spatial-multiplexed type stereoscopic display device, which reduces its optimal 3D display viewing distance by using thinned glass, the present invention provides a more efficient way to reduce the optimal 3D display viewing distance.

Those skilled in the art will readily observe that numerous modifications and alterations of the device and method may be made while retaining the teachings of the invention.

What is claimed is:

1. A 2D and 3D switchable display device, comprising:
   an organic light emitting diode (OLED) display unit, comprising a top substrate, a bottom substrate and an OLED display array disposed between the top substrate and the bottom substrate;
   a polarization activated microlens (PAM) disposed between the top substrate and the OLED display array, wherein the PAM is in contact with the top substrate and the OLED display array;
   a polarization switching unit disposed on the top substrate of the OLED display unit; and
   a polarizer disposed on the polarization switching unit.

2. The 2D and 3D switchable display device of claim 1, wherein the PAM comprises a liquid crystal polymer (LCP) layer and a structural layer, the LCP layer and the structural layer are in contact with each other, the LCP layer has an ordinary refractive index and an extraordinary refractive index, the structural layer has a refractive index, and the refractive index of the structural layer is substantially identical to one of the ordinary refractive index and the extraordinary refractive index of the LCP layer.

3. The 2D and 3D switchable display device of claim 2, wherein the LCP layer is disposed between the structural layer and the OLED display array, and the LCP layer is in contact with the OLED display array.

4. The 2D and 3D switchable display device of claim 1, wherein the polarization switching unit comprises a liquid crystal layer, a pair of alignment films, a pair of transparent conductive layers and a pair of transparent substrates, the liquid crystal layer is disposed between the pair of alignment films, the pair of alignment films is disposed between the pair of transparent conductive layers, and the pair of transparent conductive layers is disposed between the pair of transparent substrates.

5. The 2D and 3D switchable display device of claim 1, further comprising an adhesive layer disposed between the top substrate of the OLED display unit and the polarization switching unit for bonding the top substrate of the OLED display unit and the polarization switching unit.

6. A 2D and 3D switchable display device, comprising:
   an image display unit;
   a polarization switching unit, comprising:
      a bottom transparent substrate;
      a first transparent conductive layer disposed on the bottom transparent substrate;
      a second transparent conductive layer disposed on the first transparent conductive layer; and
      a top transparent substrate disposed on the second transparent conductive layer; and
   a polarization activated microlens (PAM) disposed between the second transparent conductive layer and the top transparent substrate; wherein the PAM is in contact with the second transparent conductive layer and the top transparent substrate.

7. The 2D and 3D switchable display device of claim 6, wherein the PAM comprises a liquid crystal polymer (LCP) layer and a structural layer, the LCP layer and the structural layer are in contact with each other, the LCP layer has an ordinary refractive index and an extraordinary refractive index, the structural layer has a refractive index, and the refractive index of the structural layer is substantially identical to one of the ordinary refractive index and the extraordinary refractive index of the LCP layer.

8. The 2D and 3D switchable display device of claim 7, wherein the LCP layer is disposed between the structural layer and the second transparent conductive layer, and the LCP layer is in contact with the second transparent conductive layer.

9. The 2D and 3D switchable display device of claim 6, wherein the polarization switching unit further comprises a liquid crystal layer and a pair of alignment films, the liquid crystal layer is disposed between the pair of alignment films, and the pair of alignment films is disposed between the first transparent conductive layer and the second transparent conductive layer.

10. The 2D and 3D switchable display device of claim 6, further comprising an adhesive layer disposed between the image display unit and the bottom transparent substrate of the polarization switching unit for bonding the image display unit and the bottom transparent substrate of the polarization switching unit.

11. The 2D and 3D switchable display device of claim 6, wherein the image display unit comprises a liquid crystal display unit.

* * * * *